United States Patent
Tseng

(10) Patent No.: US 7,225,354 B2
(45) Date of Patent: May 29, 2007

(54) CIRCUIT AND METHOD FOR ALIGNING TRANSMITTED DATA BY ADJUSTING TRANSMISSION TIMING FOR A PLURALITY OF LANES

(75) Inventor: Wayne Tseng, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 294 days.

(21) Appl. No.: 10/710,264

(22) Filed: Jun. 30, 2004

(65) Prior Publication Data

US 2005/0005051 A1 Jan. 6, 2005

Related U.S. Application Data

(60) Provisional application No. 60/483,927, filed on Jul. 2, 2003.

(51) Int. Cl.
*G06F 1/04* (2006.01)
*G06K 5/04* (2006.01)

(52) U.S. Cl. ................................ 713/503; 714/700

(58) Field of Classification Search ............... 713/503; 714/700
See application file for complete search history.

(56) References Cited

U.S. PATENT DOCUMENTS

| | | | |
|---|---|---|---|
| 6,359,815 B1 * | 3/2002 | Sato et al. | ............ 365/198 |
| 6,578,092 B1 * | 6/2003 | Lau et al. | ............ 710/29 |
| 2002/0009129 A1 | 1/2002 | Choi et al. | |
| 2004/0228429 A1 * | 11/2004 | Schanke et al. | ............ 375/372 |
| 2005/0024926 A1 * | 2/2005 | Mitchell et al. | ............ 365/154 |
| 2005/0141661 A1 * | 6/2005 | Renaud et al. | ............ 375/372 |

FOREIGN PATENT DOCUMENTS

CN          1383623 A          12/2002

\* cited by examiner

*Primary Examiner*—Chun Cao
*Assistant Examiner*—Ji H. Bae
(74) *Attorney, Agent, or Firm*—Winston Hsu

(57) ABSTRACT

A circuit and a method for aligning transmitted data by adjusting transmission timing for a plurality of lanes. The method includes utilizing different initial values to reset a count value corresponding to a lane when a plurality of COM symbols are detected on the lane, utilizing an increment value to increase the count value corresponding to the lane when a COM symbol is not detected on the lane, and utilizing a plurality of count values corresponding to the lanes to align transmitted data of the lanes when a COM symbol is not detected on the lanes within a predetermined period of time.

23 Claims, 4 Drawing Sheets

CIRCUIT AND METHOD FOR ALIGNING TRANSMITTED DATA BY ADJUSTING TRANSMISSION TIMING FOR A PLURALITY OF LANES

CROSS REFERENCE TO RELATED APPLICATIONS

The application claims the benefit of U.S. Provisional Application No. 60/483,927, which was filed on Jul. 2, 2003 and entitled "PCI EXPRESS LANE-TO-LANE DE-SKEW MECHANISM FOR MULTI-LANE LINKS".

BACKGROUND OF INVENTION

1. Field of the Invention

The present invention relates to a circuit and a method for controlling data transmission. More specifically, the present invention discloses a circuit and a method for aligning transmitted data by adjusting transmission timing for a plurality of lanes.

2. Description of the Prior Art

Generally speaking, data transmission in a computer system requires a data bus used for transferring predetermined data from a source device to a target device. For instance, a widely used PCI bus is capable of providing a bandwidth of 133 MB/s. However, with the development of disk array and gigabit Ethernet, the PCI bus is unable to meet requirements requested by the users. Because the manufactures of chips have anticipated the above situation, new bus architectures are developed to alleviate loading of the PCI bus. For example, with the development of 3D graphics processing, the PCI bus in charge of transmitting image data between a graphics card and a system memory has its limited bandwidth almost occupied by the image data. Therefore, other peripheral devices, which are connected to the same PCI bus, are greatly affected owing to the image data occupying most of the limited bandwidth. Then, an accelerated graphics port (AGP) architecture is adopted to take the place of the PCI bus for delivering image data. Not only is the loading of the PCI bus reduced, but also the performance of 3D graphics processing is further improved.

As mentioned above, the loading of the PCI bus is increased because of the improvement of the data processing capability of components within the computer system. Therefore, a $3^{rd}$ generation I/O (3GIO), that is, the PCI Express bus is continuously developing to substitute for the prior art PCI bus so as to provide a required large bandwidth. It is well-known that the PCI Express bus makes use of a higher operating clock and more lanes to boost the bus performance. Please refer to FIG. 1, which is a diagram of a prior art PCI Express bus 11 utilizing a plurality of lanes to transmit data. Suppose that a transmitting device 10 wants to transfer a data stream 14a to a receiving device 12. Because the PCI Express bus 11 provides 4 lanes Lane0, Lane1, Lane2, Lane3, these bytes B0–B7 included in the data stream 14a are respectively transmitted via Lanes Lane0, Lane1, Lane2, and Lane3 when the transmitting device 10 outputs the data stream 14a. In other words, two bytes B0 and B4 are passed to the receiving device 14 through the lane Lane0, two bytes B1 and B5 are passed to the receiving device 14 through the lane Lane1, two bytes B2 and B6 are passed to the receiving device 14 through the lane Lane2, and two bytes B3 and B7 are passed to the receiving device 14 through the lane Lane3. In the end, the receiving device 12 is capable of acquiring the wanted data stream 14a.

The operating clock applied to the transmitting device 10 is different from the operating clock of the receiving device 12. If the operating clock of the transmitting device 10 has frequency greater than frequency of the operating clock applied to the receiving device 12, the data transfer rate for the data stream 14a outputted from the transmitting device 10 is sure to be greater than the data receiving rate for the data stream 14a received by the receiving device 12. Therefore, a well-known overflow occurs. On the contrary, if the operating clock of the transmitting device 10 has frequency less than frequency of the operating clock applied to the receiving device 12, the data transfer rate for the data stream 14a outputted from the transmitting device 10 is sure to be less than the data receiving rate for the data stream 14a received by the receiving device 12. Therefore, a well-known underflow occurs.

In order to solve the problems generated from a mismatch of the operating clocks on the transmitting device 10 and the receiving device 12, the receiving device 12 has a plurality of elastic buffers to regulate data outputted from the transmitting device 10 and transferred through lanes Lane0, Lane1, Lane2, and Lane3. Based on the specification of the PCI Express bus, the transmitting device 10 outputs ordered sets to make the elastic buffers capable of balancing different operating clocks adopted by the transmitting device 10 and the receiving device 12. For example, each ordered set outputted from the transmitting device 10 includes a COM symbol and three SKP symbols. When an elastic buffer positioned on the receiving device 12 receives a plurality of ordered sets, the elastic buffer reduces the number of SKP symbols in these ordered sets if the operating clock of the transmitting device 10 has frequency greater than that of the operating clock applied to the receiving device 12. Therefore, the data transfer rate of the transmitting device 10 is accordingly reduced, and the above overflow problem is resolved. However, the elastic buffer increases the number of SKP symbols in these ordered sets if the operating clock of the transmitting device 10 has frequency less than that of the operating clock applied to the receiving device 12. Therefore, the data transfer rate of the transmitting device 10 is accordingly boosted, and the above underflow problem is resolved.

Generally, the transmitting device 10 respectively outputs ordered sets to lanes Lane0, Lane1, Lane2, and Lane3 at the same time. However, the lanes Lane0, Lane1, Lane2, and Lane3 might have different lengths and impedance owing to different circuit layouts. That is, during the data transmission, the lanes Lane0, Lane1, Lane2, and Lane3 might introduce different delays. Therefore, the transmitting timing of the lanes Lane0, Lane1, Lane2, and Lane3 has skews. In other words, the receiving device 12 is unable to process bytes B0, B1, B2, and B3 transmitted via lanes Lane0, Lane1, Lane2, and Lane3 at the same time. With regard to making the receiving device 12 capable of acquiring the wanted data stream 14a, how to align the transmitted data of the lanes Lane0, Lane1, Lane2, and Lane3 becomes an important issue when implementing the PCI Express bus.

SUMMARY OF INVENTION

It is therefore one of objectives of this invention to provide a circuit and a method of aligning transmitted data by adjusting transmission timing for a plurality of lanes to solve the above-mentioned problem.

Briefly summarized, the preferred embodiment of the present invention discloses a method of aligning transmitted data by adjusting transmission timing for a plurality of lanes.

The lanes are respectively connected to a plurality of elastic buffers. The method comprises (a) when a COM symbol is detected on a lane, determining if an elastic buffer corresponding to the lane adjusts the number of SKP symbols within an ordered set having the COM symbol, utilizing a first initial value to reset a count value corresponding to the lane if the elastic buffer corresponding to the lane adds an SKP symbol to the ordered set having a COM symbol, utilizing a second initial value to reset the count value corresponding to the lane if the elastic buffer corresponding to the lane deletes an SKP symbol from the ordered set having the COM symbol, utilizing a third initial value to reset the count value corresponding to the lane if the elastic buffer corresponding to the lane does not adjust the number of SKP symbols within the ordered set having the COM symbol; (b) when a COM symbol is not detected on the lane, utilizing an increment value to increase the count value corresponding to the lane; and (c) if a COM symbol is not detected on the lanes within a predetermined period of time, aligning the transmitted data of the lanes according to a plurality of count values respectively corresponding to the lanes.

It is an advantage of the present invention that an offset value is calculated dynamically. Therefore, when the numbers of compensating clock cycles are calculated, a simple logic operation is implemented to figure out differences between the count values and the offset value. In other words, the circuit and the method of aligning the transmitted data according to the present invention do not require a complicated comparing algorithm and a time-consuming searching procedure for finding the minimum value among the count values, which reduces the circuit complexity and improves the performance of aligning the transmitted data.

These and other objectives of the present invention will no doubt becomes obvious to those of ordinary skill in the art after reading the following detailed description of the preferred embodiment, which is illustrated in the various figures and drawings.

DETAILED DESCRIPTION

Figure 2:
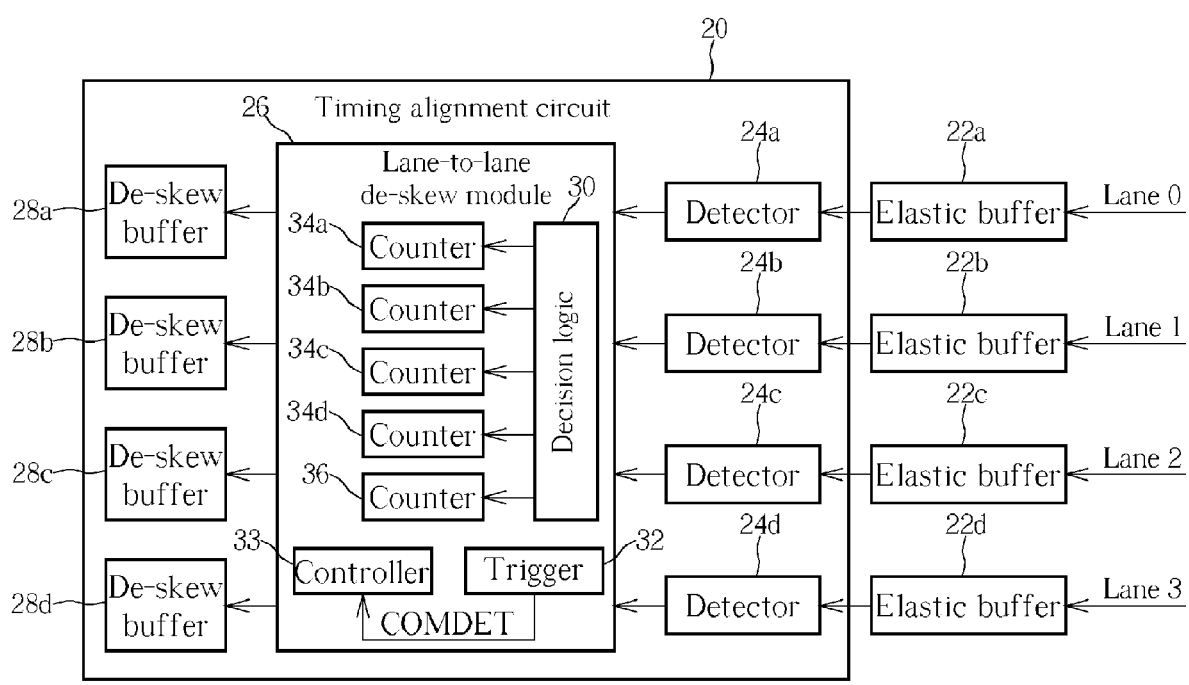
FIG. 2 is a block diagram of a data alignment circuit according to the present invention.

Please refer to FIG. 2, which is a block diagram of a data alignment circuit 20 according to the present invention. The data alignment circuit 20 has a plurality of detectors 24a, 24b, 24c, 24d, a lane-to-lane de-skew module 26, and a plurality of de-skew buffers 28a, 28b, 28c, 28d. In addition, the lane-to-lane de-skew module 26 comprises a decision logic 30, a trigger 32, a controller 33, and a plurality of counters 34a, 34b, 34c, 34d, 36. In the preferred embodiment, the data alignment circuit 20 is used for handling skews among four lanes Lane0, Lane1, Lane2, and Lane3. Please note that the data alignment circuit 20 is not limited to the number of processed lanes shown in FIG. 2. That is, the data alignment circuit 20 is capable of handling skews among a plurality of lanes. The elastic buffers 22a, 22b, 22c, 22d respectively correspond to the lanes Lane0, Lane1, Lane2, and Lane3 for adjusting the number of SKP symbols within the ordered sets transmitted via the lanes Lane0, Lane1, Lane2, and Lane3. As mentioned above, the elastic buffers 22a, 22b, 22c, 22d are used to solve the overflow and underflow problems caused by the mismatch of the operating clocks applied to the transmitting device 10 and the receiving device 12. The detectors 24a, 24b, 24c, 24d are used for detecting the COM symbols within the ordered sets transmitted via the lanes Lane0, Lane1, Lane2, and Lane3 and notifying the decision logic 30. In the preferred embodiment, the decision logic 30 resets the counters 34a, 34b, 34c, 34d to control count values corresponding to the lanes Lane0, Lane1, Lane2, and Lane3 according to increment or decrease of the number of SKP symbols on the lanes Lane0, Lane1, Lane2, and Lane3. In addition, the decision logic 30 further drives the counter 36 to count an offset value according to increment or decrease of the number of SKP symbols on the lanes Lane0, Lane1, Lane2, and Lane3. The trigger 32 generates a control signal COMDET having either a high logic level or a low logic level according to detection results outputted from the detectors 24a, 24b, 24c, 24d. That is, the control signal COMDET is used to tell if a COM symbol within the ordered sets transmitted via the lanes Lane0, Lane1, Lane2, and Lane 3 is received. In the end, the controller 33 drives the de-skew buffers 28a, 28b, 28c, 28d to tune the timing skews among the lanes Lane0, Lane1, Lane2, and Lane3 according to the control signal COMDET.

Figure 3:
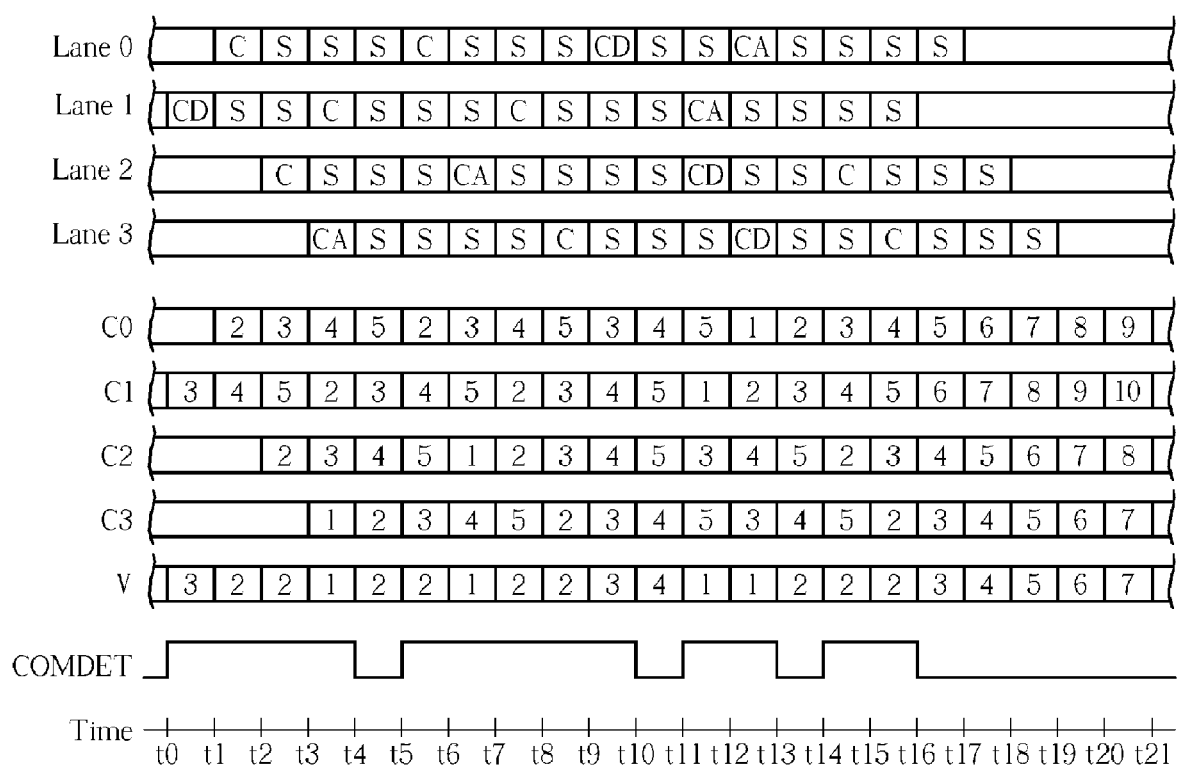
FIG. 3 is a diagram illustrating a procedure of aligning the transmitted data of lanes through the data alignment circuit according to a first embodiment of the present invention.

The controller 33 reads the count values and the offset value counted by the counters 34a, 34b, 34c, 34d, 36 for determining clock cycles required to compensate for the data transmitting timing of the lanes Lane0, Lane1, Lane2, and Lane3. The related operation is detailed as follows. Please refer to FIG. 2 in conjunction with FIG. 3. FIG. 3 is a diagram illustrating a procedure of aligning the transmitted data of the lanes Lane0, Lane1, Lane2, and Lane3 through the data alignment circuit 20 according to a first embodiment of the present invention. When a detector 24a, 24b, 24c, 24d detects a COM symbol within the ordered sets, the decision logic 30 sets count values of the counters 34a, 34b, 34c, 34d according to the following rules.

Rule (1): If an SKP symbol is deleted on a lane, a count value corresponding to the lane is set to an initial value equaling 3.

Rule (2): If an SKP symbol is added on a lane, a count value corresponding to the lane is set to an initial value equaling 1.

Rule (3): If an SKP symbol is neither added or deleted on a lane, a count value corresponding to the lane is set to an initial value equaling 2.

Furthermore, when a detector 24a, 24b, 24c, 24d does not detect any COM symbol within the ordered sets, the decision logic 30 drives the counters 34a, 34b, 34c, 34d according to the following rule.

Rule (4): If a lane has no COM symbol be detected, a count value corresponding to the lane is increased by an increment value equaling 1.

Therefore, suppose that the elastic buffers 22a, 22b, 22c, 22d adjust a plurality of ordered sets transmitted via the lanes Lane0, Lane1, Lane2, Lane3 in order to balance the mismatch of the operating clocks applied to the transmitting device 10 and the receiving device 12. The final result is shown in FIG. 3, wherein the label "C" stands for a COM symbol, and the label "S" represents an SKP symbol. In addition, the label "CA" stands for a COM symbol within an ordered set having an added SKP symbol, and the label "CD" represents a COM symbol within an ordered set having an SKP symbol be deleted.

Taking the count value C0 counted by the counter 34a for example, the detector 24a detects a COM symbol at t1, and the decision logic 30 judges that no SKP symbol within ordered sets is deleted or added on the lane Lane0 through the elastic buffer 22a. According to Rule (3), the decision logic 30 therefore assigns the initial value equaling 2 to the count value C0 corresponding to the lane Lane0. That is, the count value C0 is equal to 2. Next, the detector 24a does not detect a COM symbol at t2. Therefore, the counter 34a increases the count value C0 by the increment value equaling 1 according to Rule (4). In other words, the count value C0 is equal to 3. Similarly, the detector 24a does not detect a COM symbol at t3 and t4, and the count value C0 is increased by the same increment value twice. That is, the count value C0 before t5 becomes 5. At t5, the detector 24a detects a COM symbol, and the decision logic 30 judges that no SKP symbol within ordered sets is deleted or added on the lane Lane0 through the elastic buffer 22a. According to Rule (3), the decision logic 30 therefore utilizes the initial value equaling 2 to set the count value C0 corresponding to the lane Lane0. Following t5, the detector 24a does not detect a COM symbol at t6, t7, and t8. Therefore, the counter 34a successively increases the count value C0 by the same increment value equaling 1 according to Rule (4). The count value C0 becomes 5 before t9.

At t9, the detector 24a detects a COM symbol, the decision logic 30 judges that an SKP symbol within ordered sets is deleted on the lane Lane0 through the elastic buffer 22a. According to Rule (1), the decision logic 30 makes use of the initial value equaling 3 to set the count value C0 corresponding to the lane Lane0. Next, the detector 24a does not detect a COM symbol at t10 and t11. So, the counter 34a successively increases the count value C0 by the same increment value equaling 1 according to Rule (4). The count value C0 is equal to 5 before t12. At t12, the detector 24a detects a COM symbol, and the decision logic 30 judges that an SKP symbol is added on the lane Lane0 through the elastic buffer 22a. Based on Rule (1), the decision logic 30 utilizes the initial value equaling 1 to set the count value C0 corresponding to the lane Lane0. Next, the detector 24a does not detect a COM symbol at t13, t14, t15, and t16. The counter 24a successively increases the count value C0 by the same increment value equaling 1 according to Rule (4). Therefore, the count value C0 is equal to 5 before t17. As shown in FIG. 3, no COM symbol is transmitted on the lane Lane0 after t17. The counter 34a will utilize the same increment value equaling 1 to gradually increase the count value C0 according to Rule (4).

Concerning other counters 34b, 34c, and 34d, related operations are identical to the above-mentioned operation of the counter 34a. That is, the counters 34b, 34c, and 34d operate according to Rule (1), Rule (2), Rule (3), and Rule (4). Before t16, the count value C1 is equal to 5. As shown in FIG. 3, no COM symbol is transmitted on the lane Lane1 during an interval t16–t21. The counter 34b will utilize an increment value equaling 1 to gradually increase the count value C1. Before t18, the count value C2 is equal to 5. As shown in FIG. 3, no COM symbol is transmitted on the lane Lane2 during an interval t18–t21. The counter 34c will utilize an increment value equaling 1 to gradually increase the count value C2. Before t19, the count value C3 is equal to 5. As shown in FIG. 3, no COM symbol is transmitted on the lane Lane3 during an interval t19–t21. The counter 34d will utilize an increment value equaling 1 to gradually increases the count value C3.

As mentioned above, when the detectors 24a, 24b, 24c, 24d detect COM symbols within ordered sets, the decision logic 30 assigns different initial values to the count values according to adjustments of the number of SKP symbols respectively made by the elastic buffers 22a, 22b, 22c, 22d. In other words, when the detectors 24a, 24b, 24c, 24d detect COM symbols within ordered sets, the corresponding count values are not reset by the same initial value. However, the increment or decrease of the number of SKP symbols is taken into consideration to appropriately set the corresponding count values.

In the preferred embodiment, the counter 36 is used for counting an offset value. When a detector 24a, 24b, 24c, 24d detects a COM symbol within ordered sets, the decision logic 30 determines the offset value V counted by the counter 36 according to the following rules.

Rule (5): When an SKP symbol is deleted on a lane, the decision logic 30 controls the counter 36 according to the currently recorded offset value V. If the currently recorded offset value V is equal to 1, an initial value equaling 2 is set to the offset value V. However, if the currently recorded offset value V is not equal to 1, an initial value equaling 3 is set to the offset value V.

Rule (6): When an SKP symbol is added on a lane, an initial value equaling 1 is set to the offset value V.

Rule (7): When no SKP symbol is added or deleted on a lane, an initial value equaling 2 is set to the offset value V.

In addition, when detectors 24a, 24b, 24c, 24d do not detect any COM symbol, the decision logic 30 drives the counter 36 according to the following rule.

Rule (8): When no COM symbol is detected on a lane, the offset value V is increased by an increment value equaling 1.

The computation of the offset value V is similar to that of the count values C0, C1, C2, C3. Under the control of Rules (5), (6), (7), and (8), the offset value V is capable of recording a minimum value among these count values C0, C1, C2, C3 at each time interval. For instance, the count value C2 is the minimum value within a time interval t6–t7. Therefore, the offset value V keeps 1. However, the count value C4 is the minimum value within a time interval t8–t9. Therefore, the offset value V keeps 2 instead.

When the detectors 24a, 24b, 24c, 24d detect COM symbols within ordered sets, the trigger 32 makes the control signal COMDET correspond to a high logic level. On the contrary, the trigger 32 resets the control signal COMDET to a low logic level when the detectors 24a, 24b, 24c, and 24d do not detect any COM symbol within ordered sets. As shown in FIG. 3, the control signal COMDET corresponds to the high logic level in time intervals t0–t4, t5–t10, t11–t13, and t14–t16 for informing that at least a COM symbol is delivered on lanes Lane0, Lane1, Lane2, and Lane3. In the preferred embodiment, if the period when the control signal COMDET holds the low logic level is longer than a predetermined period of time, the data alignment circuit 20 starts tuning the skews of the data transmitting timing among the lanes Lane0, Lane1, Lane2, and Lane3. For example, suppose that each time interval (e.g. t0–t1) corresponds to one clock cycle of the data alignment circuit 20. Concerning the preferred embodiment, the controller 33 is activated to tune the data transmitting timing if the period when the control signal COMDET holds the low logic level is longer than two clock cycles. As shown in FIG. 3, the controller 33 starts working at t18. At this time, the count values C0, C1, C2, C3 respectively record 6, 7, 5, 4, and the offset value V keeps the minimum value among the count values C0, C1, C2, C3. That is, the offset value V records a value equaling 4. Then, the controller 33 calculates the number of clock cycles required to compensate for the lanes Lane0, Lane1, Lane2, Lane3 according to the count values C0, C1, C2, C3 and the offset value V. It is obvious that a difference between the count value C0 and the offset value V equals 2, a difference between the count value C1 and the offset value V equals 3, a difference between the count value C2 and the offset value V equals 1, and a difference between the count value C3 and the offset value V equals 0. In other words, the data transmitting timing of the lane Lane0 leads the data transmitting timing of the lane Lane3 by 2 clock cycles, the data transmitting timing of the lane Lane1 leads the data transmitting timing of the lane Lane3 by 3 clock cycles, and the data transmitting timing of the lane Lane2 leads the data transmitting timing of the lane Lane3 by 1 clock cycle. Therefore, the controller 33 drives the de-skew buffers 28a, 28b, 28c, 28d according to the above calculated numbers of clock cycles.

Figure 1:
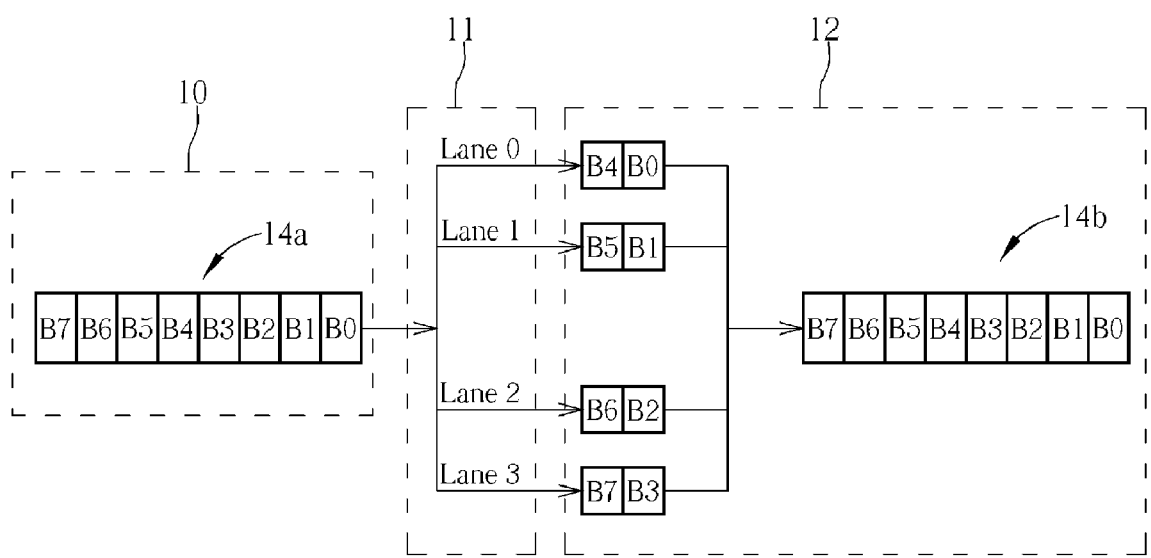
FIG. 1 is a diagram of a prior art PCI Express bus utilizing a plurality of lanes to transmit data.

In the end, the de-skew buffers 28a, 28b, 28c delay the data transmitted via the lanes Lane0, Lane1, Lane2 by 2 clock cycles, 3 clock cycles, and 1 clock cycle, respectively. With the help of the ordered sets simultaneously outputted from the transmitting device 10 to the lanes Lane0, Lane1, Lane2, Lane3, the data alignment circuit 20 according to the present invention is capable of synchronizing the data transmitting timing of the lanes Lane0, Lane1, Lane2, Lane3. Therefore, as shown in FIG. 1, the receiving device 12 is capable of acquiring a plurality of bytes B0, B1, B2, B3 transmitted via lanes Lane0, Lane1, Lane2, Lane3 at first time, and is capable of acquiring a plurality of bytes B4, B5, B6, B7 transmitted via lanes Lane0, Lane1, Lane2, Lane3 at second time. Then the wanted data stream 14a is successively received.

Figure 4:
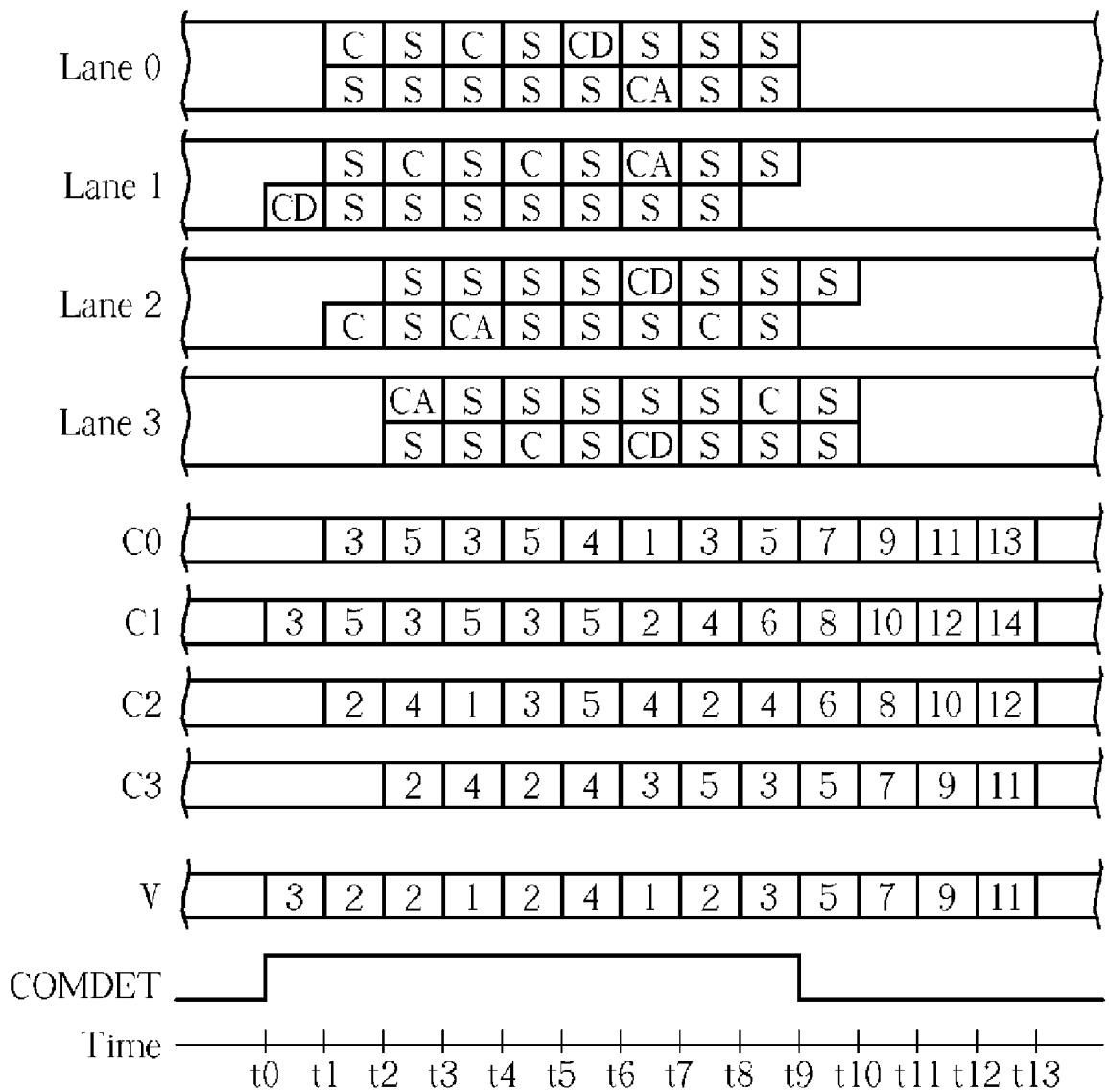
FIG. 4 is a diagram illustrating a procedure of aligning the transmitted data of lanes through the data alignment circuit according to a second embodiment of the present invention.

Regarding the above operations, the data alignment circuit 20 handles the data transmitting timing of the lanes Lane0, Lane1, Lane2, Lane3 through an 8-bit computing architecture. That is, the data alignment circuit 20 processes one byte delivered via each lane Lane0, Lane1, Lane2, Lane3 within one clock cycle. Please refer to FIG. 2 in conjunction with FIG. 4. FIG. 4 is a diagram illustrating a procedure of aligning the transmitted data of lanes Lane0, Lane1, Lane2, and Lane3 through the data alignment circuit 20 according to a second embodiment of the present invention. In this preferred embodiment, the data alignment circuit 20 handles the data transmitting timing of the lanes Lane0, Lane1, Lane2, Lane3 through a 16-bit computing architecture, so the data alignment circuit 20 now processes two bytes delivered via each lane Lane0, Lane1, Lane2, Lane3 within one clock cycle. Similarly, when detectors 24a, 24b, 24c, 24d detect COM symbols within ordered sets, the decision logic 30 sets the count values counted by the counters 34a, 34b, 34c, 34d according to the above-mentioned Rules (1), (2), and (3). In addition, when detectors 24a, 24b, 24c, 24d do not detect any COM symbol within ordered sets, the decision logic 30 drives the counters 34a, 34b, 34c, 34d according to the above-mentioned Rules (4) and (5).

Taking the count value C0 counted by the counter 34a for example, the detector 24a detects a COM symbol at t1, and the decision logic 30 judges that no SKP symbol within ordered sets is deleted or added on the lane Lane0 through the elastic buffer 22a. According to Rule (3), the decision logic 30 therefore assigns the initial value equaling 2 to the count value C0 corresponding to the lane Lane0. That is, the count value C0 is equal to 2. Please note that the data alignment circuit 20 now is capable of processing two bytes delivered via each lane Lane0, Lane1, Lane2, Lane3 within one clock cycle. Therefore, when the data alignment circuit 20 handles the next SKP symbol, the counter 34a increases the count value C0 by the increment value equaling 1 according to Rule (4) because the detector 24a does not detect a COM symbol. That is, the count value C0 is equal to 3 before t2. Similarly, the detector 24a does not detect a COM symbol at t2, so the count value C0 is increased by the same increment value twice. Therefore, the count value C0 becomes 5 before t3. At t3, the detector 24a detects a COM symbol, and the decision logic 30 judges that no SKP symbol within ordered sets is deleted or added on the lane Lane0 through the elastic buffer 22a. According to Rule (3), the decision logic 30 therefore utilizes the initial value equaling 2 to set the count value C0 corresponding to the lane Lane0. Because a following data is an SKP symbol and the detector 24a does not detect a COM symbol, the counter 34a increases the count value C0 by an increment value equaling 1 according to Rule (4). The count value C0 becomes 3 before t4.

At t5, the detector 24a detects a COM symbol, and the decision logic 30 judges that an SKP symbol within ordered sets is deleted on the lane Lane0 through the elastic buffer 22a. According to Rule (1), the decision logic 30 makes use of the initial value equaling 3 to set the count value C0 corresponding to the lane Lane0. Because a next data is an SKP symbol and the detector 24a does not detect a COM symbol, the counter 34a increases the count value C0 by the same increment value equaling 1. Therefore, the count value C0 is equal to 4 before t6. At t6, the detector 24a does not detect a COM symbol, and the decision logic 30 judges that an SKP symbol is added on the lane Lane0 through the elastic buffer 22a. Based on Rule (3), the decision logic 30 utilizes the initial value equaling 2 to set the count value C0 corresponding to the lane Lane0. However, a next data is a COM symbol and the detector 24a detects that an SKP symbol is added on the lane Lane0, the decision logic 30 makes use of the initial value equaling 1 to set the count value C0 corresponding to the lane Lane0. Before t7, the count value C0 is equal to 1. As shown in FIG. 4, no COM symbol is transmitted on the lane Lane0 after t7. The counter 34a will utilize the same increment value equaling 1 to gradually increase the count value C0 according to Rule (4). In other words, the count value C0 is increased by 2 in each clock cycle, and the result is shown in FIG. 4. With regard to other counters 34b, 34c, 34d, the related operations are identical to the above-mentioned operation. Therefore, the lengthy description is not repeated for simplicity.

As mentioned above, the counter 36 is used for counting an offset value. When a detector 24a, 24b, 24c, 24d detects a COM symbol within ordered sets, the decision logic 30 determines the offset value V counted by the counter 36 according to above-mentioned Rules (5), (6), and (7). In addition, when detectors 24a, 24b, 24c, 24d do not detect any COM symbol, the decision logic 30 drives the counter 36 according to above-mentioned Rule (8). Similarly, the offset value V is capable of recording a minimum value among these count values C0, C1, C2, C3 at each time interval. For instance, the count value C2 is the minimum value within a time interval t3–t4. Therefore, the offset value V keeps 1.

When the detectors 24a, 24b, 24c, 24d detect COM symbols within ordered sets, the trigger 32 makes the control signal COMDET correspond to a high logic level. On the contrary, the trigger 32 resets the control signal COMDET to a low logic level when the detectors 24a, 24b, 24c, 24d do not detect any COM symbol within ordered sets. As shown in FIG. 4, the control signal COMDET corresponds to the high logic level in a time interval t0–t9 for informing that at least a COM symbol is delivered on lanes Lane0, Lane1, Lane2, and Lane3. Therefore, if the period when the control signal COMDET holds the low logic level is longer than a predetermined period of time, the data alignment circuit 20 starts tuning the skews of the data transmitting timing among the lanes Lane0, Lane1, Lane2, and Lane3. It is known that the data alignment circuit 20 is capable of processing two bytes in one clock cycle. In this preferred embodiment, the controller 33 is activated to tune the data transmitting timing if the period when the control signal COMDET holds the low logic level is longer than one clock cycle. As shown in FIG. 4, the controller 33 starts working at t10. At this time, the count values C0, C1, C2, C3 respectively record 7, 8, 6, 5, and the offset value V keeps the minimum value among the count values C0, C1, C2, C3. That is, the offset value V records a value equaling 5. Then, the controller 33 calculates numbers of clock cycles required to compensate for the lanes Lane0, Lane1, Lane2, Lane3 according to the count values C0, C1, C2, C3 and the offset value V. It is obvious that a difference between the count value C0 and the offset value V equals 2, a difference between the count value C1 and the offset value V equals 3, a difference between the count value C2 and the offset value V equals 1, and a difference between the count value C3 and the offset value V equals 0. In other words, the data transmitting timing of the lane Lane0 leads the data transmitting timing of the lane Lane3 by 2 clock cycles, the data transmitting timing of the lane Lane1 leads the data transmitting timing of the lane Lane3 by 3 clock cycles, and the data transmitting timing of the lane Lane2 leads the data transmitting timing of the lane Lane3 by 1 clock cycle. Therefore, the de-skew buffers 28a, 28b, 28c delay the data transmitted via the lanes Lane0, Lane1, Lane2 by 2 clock cycles, 3 clock cycles, and 1 clock cycle, respectively. With the help of the ordered sets simultaneously outputted from the transmitting device 10 to the lanes Lane0, Lane1, Lane2, Lane3, the data alignment circuit 20 according to the present invention is capable of synchronizing the data transmitting timing of the lanes Lane0, Lane1, Lane2, Lane3.

When a COM symbol on a lane is detected, the circuit and method of aligning the transmitted data have different count values available to a lane according to the number of SKP symbols adjusted by the elastic buffer corresponding to the lane. Therefore, a count value varies according to the variation related to the data length of the ordered set on the lane. That is, if the number of SKP symbols is not altered, a value equaling N is used to initialize the count value. However, if an SKP symbol is deleted, the data length of the ordered set is reduced. Therefore, a value equaling (N+K) is used to initialize the count value. In addition, if an SKP symbol is added, the data length of the ordered set is increased. Then, a value equaling (N−K) is used to initialize the count value. Please note that the value K is the increment value for the count value. Suppose that an ordered set outputted from a transmitting device includes a COM symbol and three SKP symbols. If a corresponding elastic buffer on a receiving device does not change the number of SKP symbols, the last SKP symbol will make a count value equal N+3K. If the elastic buffer on the receiving device deletes one SKP symbol (that is, the ordered set now includes one COM symbol and two SKP symbols), and last SKP symbol will make the count value equal N+3K. However, if the elastic buffer on the receiving device adds one SKP symbol (that is, the ordered set now includes one COM symbol and four SKP symbols), the last SKP symbol will make the count value equal N+3K, too.

It is well-known that these elastic buffers corresponding to a plurality of lanes do not have an identical characteristic owing to variations of the semiconductor process. As shown in FIG. 3, the ordered sets on lanes Lane0, Lane1, Lane2, Lane3, therefore, are adjusted at different times for changing numbers of SKP symbols. If a fixed value is used to initialize count values when COM symbols are detected, the timing skews of the lanes Lane0, Lane1, Lane2, Lane3 cannot be exactly known from the count values. Taking FIG. 3 for example, the count values C0, C1, C2, C3 erroneously correspond to 7, 8, 5, 4 if a fixed value is used to initialize count values. The circuit and method of aligning transmitted data according to the present invention allow the last SKP symbol to correspond to the same count value. Though the elastic buffers add or delete the SKP symbols at different times, the circuit and method of aligning transmitted data according to the present invention is capable of correctly tracking the timing skews among the lanes Lane0, Lane1, Lane2, Lane3 according to the calculated count values.

Furthermore, during the process of computing the count values C0, C1, C2, C3, the circuit and method of aligning transmitted data according to the present invention calculate an offset value V at the same time. The offset value V records a minimum value among the count values C0, C1, C2, C3. Therefore, when the numbers of compensating clock cycles are calculated, a simple logic operation is implemented to figure out differences between the count values C0, C1, C2, C3 and the offset value V. In other words, the circuit and method of aligning transmitted data according to the present invention do not require a complicated comparing algorithm and a time-consuming searching procedure for finding the minimum value among the count values C0, C1, C2, C3, which reduces the circuit complexity and improves the performance of aligning the transmitted data.

Those skilled in the art will readily observe that numerous modifications and alterations of the device may be made while retaining the teachings of the invention. Accordingly, the above disclosure should be constructed as limited only by the metes and bounds of the appended claims.

What is claimed is:

1. A method of aligning transmitted data by adjusting transmission timing for a plurality of lanes, the lanes being respectively connected to a plurality of elastic buffers, the method comprising:

determining if an elastic buffer corresponding to the lane adjusts the number of SKP symbols within an ordered set having the COM symbol when a COM symbol is detected on a lane;

resetting a count value corresponding to the lane to a first initial value if said elastic buffer corresponding to the lane adds an SKP symbol to the ordered set having said COM symbol;

resetting said count value corresponding to the lane to a second initial value if said elastic buffer corresponding to the lane deletes said SKP symbol from the ordered set having said COM symbol;

resetting said count value corresponding to the lane to a third initial value if said elastic buffer corresponding to the lane does not adjust the number of SKP symbols within the ordered set having said COM symbol;

increasing said count value corresponding to the lane by an increment value when a COM symbol is not detected on the lane; and aligning the transmitted data by adjusting transmission timing for the plurality of lanes according to a plurality of count values receptively corresponding to the lanes if a COM symbol is not detected on the lanes within a predetermined period of time.

2. The method of claim 1, wherein said second initial value is greater than said third initial value and said third initial value is greater than said first initial value.

3. The method of claim 1, wherein a difference between said second and said third initial values is equal to a difference between said third and said first initial values.

4. The method of claim 1, wherein each of a difference between said second third initial values and a difference between said third third initial values and said first initial values is equal to said increment value.

5. The method of claim 1, further comprising: recording an offset value, wherein said offset value is the minimum value among said count values.

6. The method of claim 5, further comprising: when said COM symbol is detected on the lane, resetting said offset value to said second initial value if said elastic buffer corresponding to the lane deletes said SKP symbol from the ordered set having said COM symbol.

7. The method of claim 5, further comprising:
when said COM symbol is detected on the lane, resetting said offset value to the third initial value if said elastic buffer corresponding to the lane deletes said SKP symbol from the ordered set having said COM symbol and said offset value currently corresponds to said first initial value.

8. The method of claim 5, further comprising:
when said COM symbol is detected on the lane, resetting said offset value to said first initial value if said elastic buffer corresponding to the lane adds said SKP symbol to the ordered set having said COM symbol.

9. The method of claim 5, further comprising:
when said COM symbol is detected on the lane, resetting said offset value to said third initial value if said elastic buffer corresponding to the lane does not adjust said number of SKP symbols within the ordered set having said COM symbol.

10. The method of claim 5, further comprising:
when said COM symbol is not detected on the lane, increasing said offset value by said increment value.

11. The method of claim 5, further comprising:
calculating a plurality of differences between said count values and said offset value, and aligning the transmitted data by adjusting transmission timing for the lanes according to said differences.

12. The method of claim 1, further comprising:
if said COM symbol is detected on lanes, triggering a control signal having a transition from a first logic level to a second logic level; and
if said COM symbol is not detected on lanes, resetting said control signal wherein said control signal has a transition from the second logic level to the first logic level.

13. The method of claim 12, wherein said transmitted data for the plurality of lanes is aligned if a period when said control signal holds the first logic level is longer than the predetermined period of time.

14. A data alignment circuit for aligning transmitted data by adjusting transmission timing for a plurality of lanes, the lanes respectively connected to a plurality of elastic buffers, said data alignment circuit comprising:

a plurality of detectors coupled to the lanes for detecting COM symbols within ordered sets transmitted via the lanes;
a plurality of first counters for counting a plurality of count values corresponding to the lanes;
a decision logic coupled to said detectors and said first counters for determining whether an elastic buffer corresponding to a lane adjusts the number of SKP symbols within an ordered set having said COM symbol when said COM symbol is detected on the lane, wherein said decision logic resets a count value corresponding to the lane to a first initial value if said elastic buffer corresponding to the lane adds an SKP symbol to the ordered set having said COM symbol, the decision logic resets said count value corresponding to the lane to a second initial value if said elastic buffer corresponding to the lane deletes said SKP symbol from the ordered set having said COM symbol, and said decision logic resets said count value corresponding to the lane to a third initial value if said elastic buffer corresponding to the lane does not adjust the number of SKP symbols within the ordered set having said COM symbol;
a plurality of de-skew buffers; and
a controller coupled to said first counters and said de-skew buffers for driving said de-skew buffers to align the transmitted data of the lanes according to said count values respectively corresponding to the lanes if said detectors do not detect said COM symbol within a predetermined period of time;
wherein if said detector does not detect said COM symbol on the lane, a first counter corresponding to the lane increases said count value corresponding to the lane by an increment value.

15. The data alignment circuit of claim 14, wherein said second initial value is greater than said third initial value and said third initial value is greater than said first initial value.

16. The data alignment circuit of claim 14, wherein a difference between said second and said third initial values is equal to a difference between said third and said first initial values.

17. The data alignment circuit of claim 14, wherein each of a difference between said second and said third initial values and a difference between said third and said first initial values is equal to said increment value.

18. The data alignment circuit of claim 14, further comprising:
a second counter coupled to said decision logic for counting an offset value, wherein said offset value is the minimum value among said count values.

19. The data alignment circuit of claim 18, wherein when said COM symbol is detected on the lane, said decision logic determines if said elastic buffer corresponding to the lane adjust the number of SKP symbols within the ordered set having said COM symbol for resetting said offset value by one of said first, said second, and said third initial values.

20. The data alignment circuit of claim 18, wherein if said detectors do not detect said COM symbol on the lanes, said second counter increases said offset value by said increment value.

21. The data alignment circuit of claim 14, wherein said controller calculates a plurality of difference between said count values and said offset value, and aligns the transmitted data of the lanes according to said differences.

22. The data alignment circuit of claim 14, further comprising:

a trigger coupled to said detectors and said controller for generating a control signal used for controlling said controller to drive said de-skew buffers to align the transmitted data of the lanes;

wherein if said detectors detect said COM symbol on the lanes, said trigger triggers and control signal having a transition from a first logic level to a second logic level, and if said detectors do not detect said COM symbol on the lanes, said trigger resets said control signal wherein said control signal has a transition from the second logic level to the first logic level.

23. The data alignment circuit of claim 22, wherein said controller aligns the transmitted data of the lanes if a period when said control signal holds the first logic level is longer than the predetermined period of time.

* * * * *